United States Patent [19]

Ono et al.

[11] Patent Number: 4,985,852
[45] Date of Patent: Jan. 15, 1991

[54] METHOD OF AND APPARATUS FOR DRIVING A DOT ARRAY RECORDER

[75] Inventors: Kohei Ono; Hitoshi Satoh; Masako Kutsuma, all of Tokyo, Japan

[73] Assignee: Nihon Kohden Corporation, Tokyo, Japan

[21] Appl. No.: 321,122

[22] Filed: Mar. 9, 1989

[30] Foreign Application Priority Data

Mar. 9, 1988 [JP] Japan .................................. 63-53810

[51] Int. Cl.[5] ........................................... G06K 15/00
[52] U.S. Cl. ...................................... 364/519; 364/521; 364/900
[58] Field of Search ............... 364/518, 519, 520, 521, 364/235, 237.2, 237.3, 927.2, 927.4, 930; 358/296; 346/76 PH, 154, 1.1

[56] References Cited

U.S. PATENT DOCUMENTS 4,845,514 7/1989 Mitsushima et al. ........... 346/76 PH

Primary Examiner—Arthur G. Evans
Attorney, Agent, or Firm—Sughrue, Mion, Zinn, Macpeak & Seas

[57] ABSTRACT

A CRT controller can be included in a device for driving a dot array recorder. Image processed data output by the CRT controller is stored in a buffer memory. This data stored in the buffer memory is shifted by one raster in response to a vertical sync signal from the CRT controller. The period of the vertical sync signal is set through a command input device to correspond to the paper feed speed and the printing line density. A data display timing signal is output by the CRT controller to a data holding circuit. The raster of data shifted out of the buffer memory is held by the holding circuit and printed on a recording surface by a recording head.

20 Claims, 3 Drawing Sheets

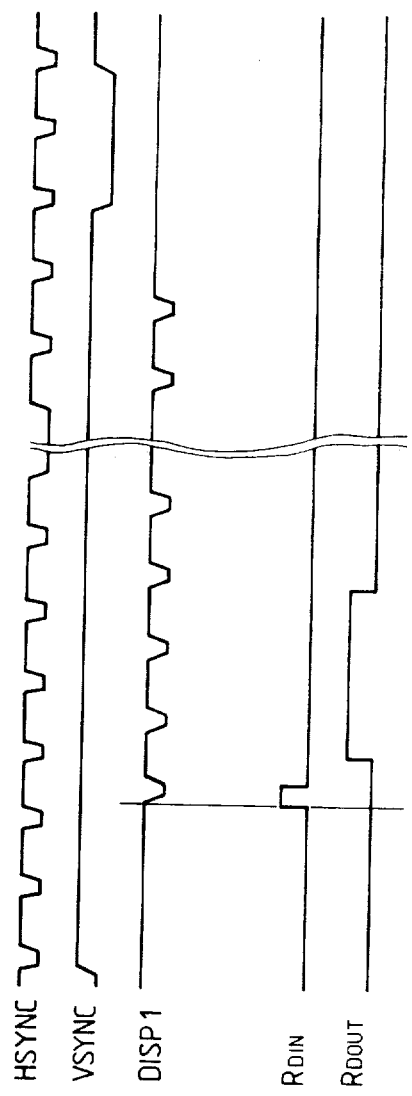

METHOD OF AND APPARATUS FOR DRIVING A DOT ARRAY RECORDER

BACKGROUND OF THE INVENTION

The present invention relates to a method of driving a dot array recorder in which the data stored in the memory of a data processing circuit is incorporated into a data holding circuit line by line and printed by means of a thermal head, LED head or some other device having a linear array of dot elements.

The drive method contemplated by the present invention is capable of high-density overwriting of input signals supplied on-line, or of allowing an input signal within a given period of time to be displayed after being changed to a lower speed, with optional addition of a symbol, a graphic form, etc.

Conventionally, when using a thermal head recorder, LED recorder, etc., a design change was necessary for recording data that had been subjected to the processing described above. This necessitated a large number of programming steps for data processing.

SUMMARY OF THE INVENTION

An object, therefore, of the present invention is to provide a method of driving a dot array recorder using a thermal head, LED head, etc. that is capable of cost-effective recording of the data stored in a memory after being subjected to complex processing.

The present invention attains this object by making use of an existing microelectronic raster scanning CRT controller that comprises a picture drawing processor, a display processor, a timing processor, an input interface, and an output interface. The picture drawing processor performs image processing after interpreting an externally set command and stores the image processed data as a dot pattern in a buffer memory. The display processor controls the buffer memory in accordance with the format designated by the externally set command and produces a display on the CRT. The timing processor generates a CRT control signal and various timing signals necessary for internal processing. The input interface interfaces with the externally set command and input signals, and the output interface interfaces with the CRT and the buffer memory.

A buffer memory is used to store image processed data output by the CRT controller. In response to a vertical sync signal and a data display timing signal output from the CRT controller, the image processed data in the buffer memory is shifted and one raster is output and held in a data holding circuit. This raster is printed on a recording surface by a thermal head recorder.

BRIEF DESCRIPTION OF THE DRAWINGS

Other features and advantages of the present invention will be apparent from the following description taken in connection with the accompanying drawings, wherein:

FIG. 3 is a timing diagram describing the operation of the circuit shown in FIG. 1.

DETAILED DESCRIPTION OF THE INVENTION

Figure 1:
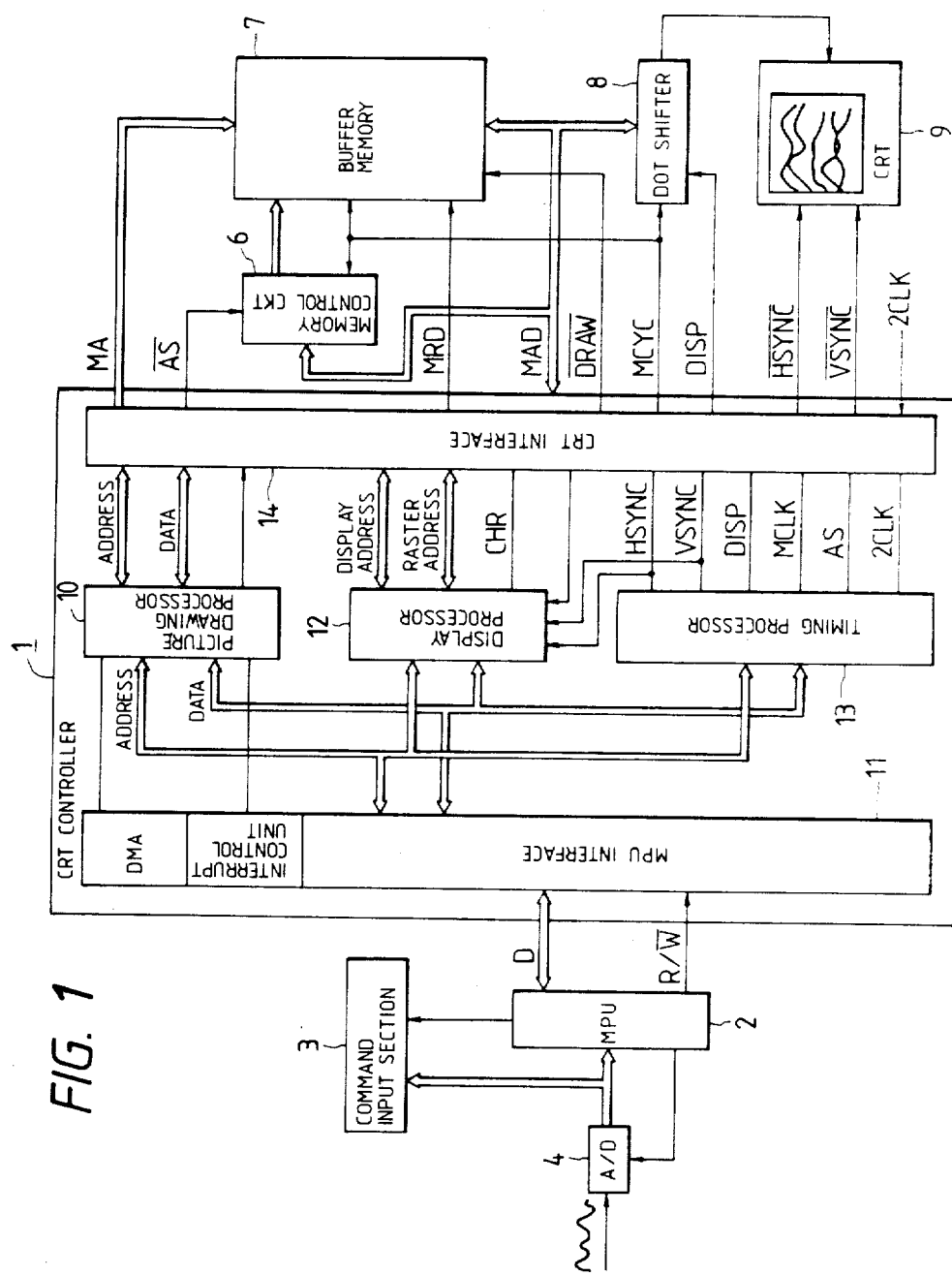
FIG. 1 is a block diagram showing the circuit configuration of a CRT display system that makes use of a commercial raster scanning CRT controller.

The raster scanning CRT controller used in the present invention may be an LSI chip such as the one manufactured by Hitachi, Ltd. and sold under the trade name ACRTC (Advanced CRT Controller) having model number HD 63484. FIG. 1 shows a circuit in which this CRT controller is used to overwrite analog waveforms on the CRT. This is the original intended use of this controller (only the input and output signals of the CRT controller which are used are shown in FIG. 1).

The CRT controller indicated by reference numeral 1 comprises a picture drawing processor 10 that interprets a transferred command and stores image processed data in a buffer memory 7, an MPU interface 11 on the input side, a display processor 12 that controls the buffer memory 7 in accordance with the format of a display to be produced on a CRT 9, a timing processor 13 that generates a CRT control signal and the various timing signals necessary for internal processing, and a CRT interface 14 on the output side.

Microprocessor (MPU) 2 receives both the input waveform data digitized in an A/D converter 4 and the command generated by external operation of a switch in a command input section 3 and transfers them to the CRT controller 1. Memory control circuit 6 latches an address signal in data address MAD in response to address strobe AS and performs dynamic control over buffer memory 7. In synchronism with clock signal MCYC which is generated during the output of a data display timing signal DISP1, dot shifter 8 produces serial output on CRT 9 of the data transferred from the buffer memory 7. Addressing buffer memory 7 is accomplished by an address signal in the data address MAD and an added address signal MA. Depending on mode selection by a READ/WRITE signal MRD, buffer memory 7 either reads or writes picture drawing data in synchronism with clock signal MCYC. Reference numerals 2, 3 and 6-8 indicate accessories to CRT controller 1.

The operation of the CRT display system shown in FIG. 1 starts with activating the command input section 3 to externally set a format for one frame of the display to be produced on CRT 9 such as overwriting, display speed or display density. An input signal is then digitized in the A/D converter 4 and incorporated into the MPU 2. R/W signals, selected for a WRITE mode, are sequentially stored in the memory of the picture drawing processor 10. When data for one frame has been incorporated, the externally set command is interpreted and data for overwriting is prepared in accordance with a built-in picture drawing program. Buffer memory 7 is then successively supplied with the data for overwriting which is consecutively shifted in a vertical direction by one horizontal raster. In a similar way, a series of data for one frame are stored consecutively in the buffer memory.

In order to produce a display on the CRT 9, a display start command externally set on command input section 3 is transferred into the timing processor 13 through MPU 2. As a result, a draw signal DRAW is switched to a display mode and raster scanning is started in synchronism with a vertical sync signal VSYNC. Each time a horizontal sync signal HSYNC is generated, dot data for one raster at a relevant vertical scanning position is supplied to CRT 9 from dot shifter 8 during the period in which a data display timing signal DISP1 is generated. The waveform of the output data produced on CRT 9 is also shown in FIG. 1. Such an overwriting operation is repeated each time a vertical sync signal VSYNC is generated.

If one wants to perform overwriting with a thermal head recorder as in the present invention, one could relate the number of addresses for a signal raster in buffer memory 7 to the number of dot elements in the thermal head. Then serial printing could be performed in a linear form in accordance with the feed speed of the recording paper and line density, with data for one raster from buffer memory 7 being serially held in a vertical direction in a data holding circuit.

This idea, however, has the following problems. First, the dot transfer speed of the thermal head recorder is slower than the sweep speed of the CRT. Thus, the recorder is usually incapable of synchronous operation even at the lowest operating frequency of the CRT controller 1. Even if synchronous operation is possible, the preparation of picture drawing data inevitably becomes slow, making it difficult to draw complex waveforms on the CRT.

In order to overcome these difficulties, a raster scanning CRT controller to be used in the present invention is externally set in such a way that the period of a vertical sync signal corresponds to the paper feed speed and the printing density and that the controller will perform a scroll read-out operation (i.e., the readout content of the buffer memory is shifted by one raster each time a vertical sync signal is output). In accordance with the present invention, each time a vertical sync signal is generated, image data for one raster at the time of generation of a predetermined horizontal sync signal is taken out of the buffer memory and incorporated into a data holding circuit. This allows a thermal head to print characters in successive lines each time a vertical sync signal is generated.

Figure 2:
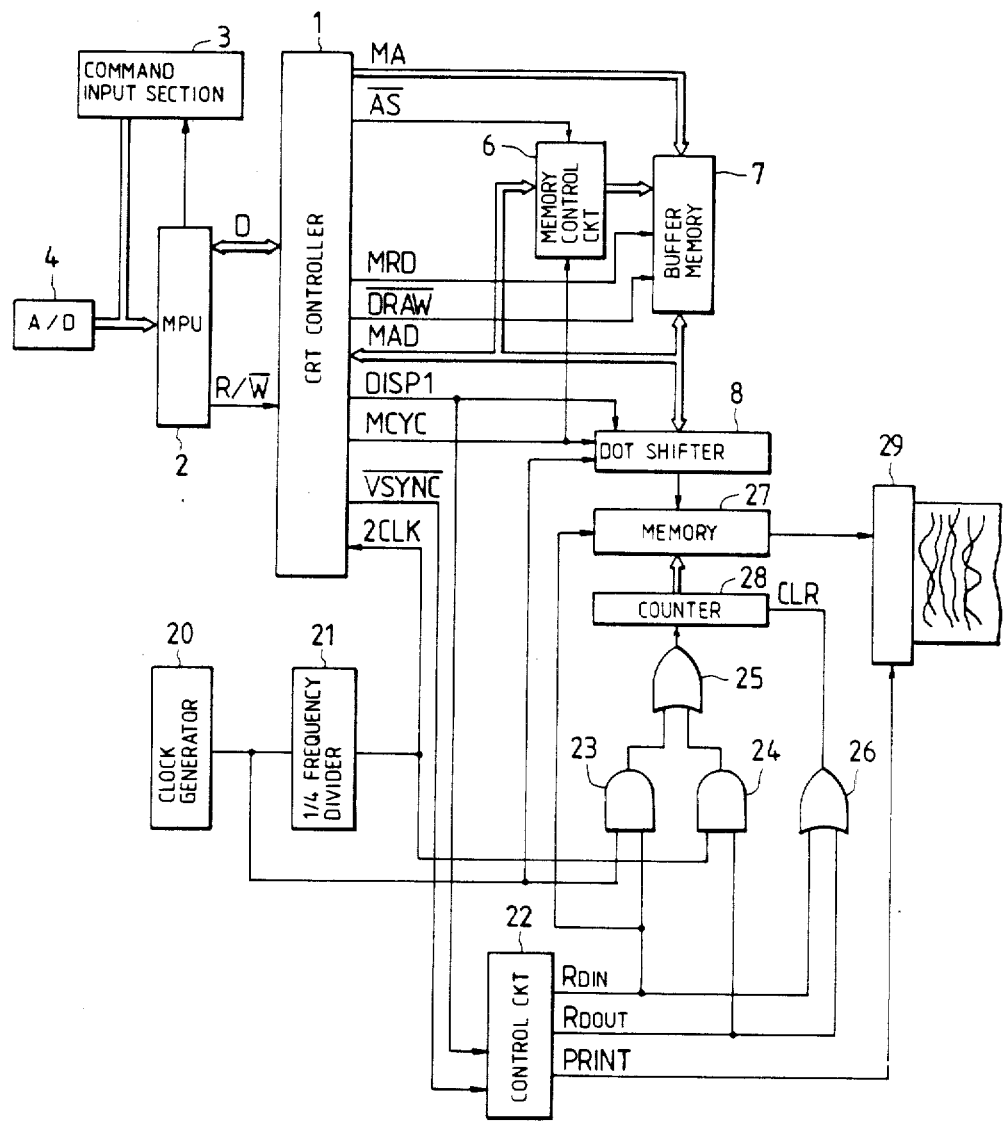
FIG. 2 is a block diagram showing the circuit configuration for implementing the method of the present invention for driving a dot array recorder.

FIG. 2 is a block diagram showing the circuit configuration for implementing the method for driving a thermal array recorder as in the present invention. The circuitry shown in FIG. 2 utilizes all the elements shown in FIG. 1 except for CRT 9.

In FIG. 2 clock generator 20 generates an initial clock signal having a frequency of 20 MHz. Frequency divider 21 divides the frequency of the initial clock signal by four and generates a clock signal 2CLK which is supplied to CRT controller 1. As shown in FIG. 3, when the first low data display timing signal DISP1 is supplied to a control circuit 22 after a vertical sync signal VSYNC has been supplied, control circuit 22 outputs a data input signal $R_{DIN}$ that corresponds to the duration of time for which DISP1 is low. Control circuit 22 outputs a data output signal $R_{DOUT}$ as soon as $R_{DIN}$ disappears, which is then followed by generation of a printing signal (PRINT). Dot data is incorporated from a dot shifter 8 into a memory 27 at the address designated by a counter 28. The stored data is read out from memory 27 by a thermal head recorder 29. The control circuit 22, memory 27, counter 28, AND gates 23 and 24, and OR gates 25 and 26 make up a data holding circuit 30 for thermal head recorder 29.

If the printing density of the thermal head recorder 29 is 20 lines/mm and the paper feed speed is 100 mm/sec, the number of lines to be printed per second is 2,000. Therefore, the time required for printing one line is 500 μsec. If a clock signal having a frequency of 20 MHz is used, the clock frequency per dot is 50 ns.

If a thermal head having 1,728 dots is used, the time required for these dots to be transferred from the dot shifter 8 to the memory 27 is 86.4 μsec (1,728×50 ns). This time corresponds to the duration of time for which DISP1 is low. The period of horizontal synchronization including the duration of time for which the HSYNC signal is low is supposed to be 125 μsec. Since the period of vertical synchronization is 500 μsec, four horizontal synchronizations will be counted within the period of one vertical synchronization, as shown in the timing diagram in FIG. 3.

The operation of the system shown in FIG. 2 proceeds as follows. In response to the interpretation of a command by picture drawing processor 10, buffer memory 7 stores image processed data for one frame and performs a scroll readout operation. Each time a vertical sync signal VSYNC is generated, a data input signal $R_{DIN}$ is generated in synchronism with the first low occurrence of data display timing signal DISP1. This brings memory 27 into a write mode. In the meantime, a clock of 20 MHz is supplied into the counter 28 through AND gate 23 and OR gate 25. This allows data in dot shifter 8 to be incorporated into memory 27 at a relevant address. When a data output signal $R_{DOUT}$ is generated immediately thereafter, memory 27 is brought into a readout mode in the absence of data input signal $R_{DIN}$. Then, in response to a clock 2CLK of 5 MHz which is supplied through AND gate 24 and OR gate 25, counter 28 addresses memory 27 at a slow speed in accordance with the response speed of the thermal head for sending printing data successively to the thermal head recorder 29. Printing occurs when a printing signal (PRINT) has been supplied from control circuit 22. Counter 28 is cleared when $R_{DIN}$ or $R_{DOUT}$ disappears.

As a result, data for the first horizontal raster is printed in a vertical direction on CRT 9 (see FIG. 1) in response to the first supplied vertical sync signal. When the next vertical sync signal is generated, buffer memory 7 is controlled for scroll operation to enable printing of data for the next raster. In a similar way, each time a vertical sync signal is generated, dot display data on CRT 9 is shifted vertically by one line, thereby displaying data in an overwrite mode.

Such overwriting can be performed not only for one frame but also in a continuous way. The printing of a date, character or some other information on a recording surface can also be accomplished by merely setting the command input section 3 in such a way that relevant data is transferred from an accessory data ROM into MPU 2.

Various other types of integrated circuits can be adopted in the raster scanning CRT controller which is to be used in the drive method of the present invention and the format of display that can be realized by the present invention is not limited to that of overwriting. Modifications can also be made to the data holding circuit. For instance, memory 27 may be omitted or the holding circuit may be configured in such a way that data for each raster which does not occur first can be printed each time a vertical sync signal is generated instead of vertically shifting each raster by one line.

As described on the foregoing pages, the drive method of the present invention allows a dot array recorder such as a thermal head recorder or an LED head recorder to perform recording of waveforms in various formats or to display characters or graphic forms. This can be realized by adding only a few circuits to a commercial raster scanning CRT controller that is capable of externally setting a command. Since there is no need to prepare a special program for this method, a great economic advantage will result and even complicated contents can be displayed at high speed.

What is claimed is:

1. A method of driving a recording device in synchronism with a CRT driving system having a CRT sync signal, said method comprising the steps of:
   (a) storing image processed data in a first memory for CRT driving system;
   (b) supplying a data input signal in response to a data display timing signal received a predetermined time after said CRT sync signal;
   (c) storing part of said stored image processed data in a second memory in response to said data input signal;
   (d) supplying a data output signal after said image processed data has been stored in said second memory;
   (e) supplying, in response to said data output signal, the image processed data stored in said second memory to a recording head at a speed corresponding to a response speed of said recording head, and
   (f) printing said image processed data supplied to said recording head.

2. A method of driving a recording device as claimed in claim 1, wherein the period of said CRT sync signal corresponds to paper feed speed and printing line density parameters of said recording device.

3. A method of driving a recording device as claimed in claim 1, wherein image processed data corresponding to one raster print line is stored in said second memory in response to said data input signal, and steps (b–f) are repeated upon each consecutive occurrence of said CRT sync signal in order to print consecutive raster printer lines.

4. A method of driving a recording device as claimed in claim 1, wherein said recording head is one of a thermal head and an LED head.

5. A method of driving a recording device as claimed in claim 1, wherein said recording head has a linear array of dot elements.

6. A method of driving a recording device as claimed in claim 1, further comprising the step of shifting the image processed data of said first memory by one raster line each time said CRT sync signal is received.

7. A method of driving a recording device as claimed in claim 1, wherein said data display timing signal and said CRT sync signal are supplied by a CRT controller.

8. A method of driving a recording device as claimed in claim 1, wherein said data input signal is supplied at the first occurrence of a predetermined level of said data display timing signal after an occurrence of a predetermined level of said CRT sync signal.

9. A method of driving a recording device as claimed in claim 1, wherein said CRT sync signal is a vertical sync signal of said CRT driving system.

10. A method as claimed in claim 6, wherein
    a number of addresses for storing each of a plurality of raster lines in said first memory is set to correspond to a number of dot elements in each raster line.

11. A recording device operating in synchronism with a CRT driving system having a CRT sync signal, said device comprising:
    recording head means;
    first memory means for storing image processed data for use in said CRT driving system;
    input signal means for supplying a data input signal in response to a data display timing signal receiving a predetermined time after said CRT sync signal;
    second memory means for storing part of said stored image processed data in response to said data input signal;
    output signal means for supplying a data output signal after said image processed data has been stored in said second memory means;
    recording data means for supplying, in response to said data output signal, the image processed data stored in said second memory means to said recording head means at a speed corresponding to a response speed of said recording head means.

12. A recording device as claimed in claim 11, wherein the period of said CRT sync signal corresponds to paper feed speed and printing line density parameters of said recording device.

13. A recording device as claimed in claim 11, wherein said second memory means is constructed to store image processed data corresponding to one raster print line in response to said data input signal, and said input signal means, second memory means, output signal means and recording data means are constructed to repeat their respective functions upon each consecutive occurrence of said CRT sync signal in order to print consecutive raster print lines.

14. A recording device as claimed in claim 11, wherein said recording head means is one of a thermal head and an LED head.

15. A recording device as claimed in claim 11, wherein said recording head means has a linear array of dot elements.

16. A recording device as claimed in claim 11, further comprising shifting means for shifting the image processed data of said first memory means by one raster line each time said CRT sync signal is received.

17. A recording device as claimed in claim 11, wherein said data display timing signal and said CRT sync signal are supplied by a CRT controller.

18. A recording device as claimed in claim 11, wherein said data input signal is supplied at the first occurrence of a predetermined level of said data display timing signal after an occurrence of a predetermined level of said CRT sync signal.

19. A recording device as claimed in claim 11, wherein said CRT sync signal is a vertical sync signal of said CRT driving system.

20. A recording device as claimed in claim 16, wherein:
    a number of addresses for each of a plurality of raster lines in said first memory means is set to correspond to a number of dot elements in each raster line.

* * * * *